United States Patent [19]

Smith

[11] Patent Number: 4,498,377
[45] Date of Patent: Feb. 12, 1985

[54] GOURMET HOT TAMALE MACHINE

[76] Inventor: Earnest L. Smith, 6738 Ave. N, Houston, Tex. 77011

[21] Appl. No.: 631,737

[22] Filed: Jul. 17, 1984

[51] Int. Cl.³ .................. A21C 3/04; A21C 9/00; A21C 9/06

[52] U.S. Cl. .................. 99/450.7; 99/450.6; 425/132; 425/133.1

[58] Field of Search ............ 99/450.1, 450.2, 450.6, 99/450.7, 450.8, 356; 426/282–284; 425/132, 133.1, 131.1, 511, 515; 53/266 R

[56] References Cited

U.S. PATENT DOCUMENTS

| | | | |
|---|---|---|---|
| 1,871,837 | 8/1932 | Brown | 99/450.8 |
| 3,667,971 | 6/1972 | Brunner | 426/282 |
| 3,757,676 | 9/1973 | Pomara, Jr. | 99/450.7 |
| 3,782,272 | 1/1974 | Cooper | 99/450.7 |
| 4,084,493 | 4/1978 | Quintana | 99/450.7 |
| 4,393,758 | 7/1983 | Anmahian | 99/450.7 |

*Primary Examiner*—Timothy F. Simone
*Attorney, Agent, or Firm*—Roy H. Smith, Jr.

[57] ABSTRACT

Disclosed is a hand powered, crank operated structure whose principal moving component is a horizontal and generally cylindrical barrel having built thereon a pair of stub loading extending tubes from one side of the barrel. These stub tubes are disported in parallel and side-by-side fashion, and one of them, for instance the dough tube, lies to the left, closer to the discharge end of the barrel than the other, the meat or filler tube. The barrel is allowed to rest on the horizontal base of the machine's framework with its solid end, opposed to the discharge end, supported by and extending through an end wall of the framework and connected to a hand lever. The lever is used to rotate the barrel between two positions of the stub tubes, one at 45 degrees in which the tube ends are exposed for convenient loading, and a vertical position in which such ends are covered by a pair of overhanging fixed sleeves which serve as guides for a pair of vertically reciprocating rams which are lowered through a power stroke by the use of a hand crank. The right hand ram pushes down on the meat or other filler loaded into the right hand stub tube and pushes the meat through a centrally disposed longitudinal tube mounted on the axis of the barrel and extending to its discharge end. At the same time, the left hand ram contacts the dough or masa in the left hand stub tube and forces it into an interconnecting annulus of a second long tube also mounted on the longitudinal axis of the barrel, coaxially with the central tube and extending to the same discharge end.

At the end of the power stroke, nothing further can be extruded from the discharge orifice of the barrel, and the operator makes a clean cut of the extruded hot tamale, wraps it in a corn shuck preparatory to steaming (not involved here), and reverses the action of the hand crank to raise the rams and thus free the stub loading tubes for rotation to the 45 degree position to start a second cycle.

9 Claims, 4 Drawing Figures

GOURMET HOT TAMALE MACHINE

FIELD OF INVENTION

The present invention is broadly classifiable with tools and equipment used in the preparation of food, i.e., kitchen tools. More narrowly, it lies within a sub-genus here denominated "gourmet" equipment and tools, implying that only hand power is involved and that taste is accented rather than rapid, high volume production of the hot tamales involved. Despite the name "hot tamale", the present invention involves only equipment operating at ambient or room temperatures.

BACKGROUND AND PRIOR ART

The present inventor sought and seeks to provide a simple and inexpensive machine that the average person can use in his own kitchen to prepare neatly rolled hot tamales which may then be properly steamed or otherwise heated before eating. The hot tamale is, of course, the familiar hollow tube of cooked dough or masa filled with a spiced meat which is cooked or heated at the same time. Many persons who were not raised in the hot tamale making tradition lack the finger dexterity to roll these delicious food items by hand, and the present invention is particularly addrressed to them. It is not suggested as a machine for use in restaurants or in those commercial establishments where high speed, high volume production is necessary, but is suggested for those who live a less hectic life style and are willing to take the time to provide the best tasting foods.

Surprisingly, the present inventor was unable to locate any prior art teaching or suggesting a hot tamale making machine for the gourmet. There are many prior U.S. patents dealing with the making of hot tamales, but invariably they disclose equipment wherein continuous high production is the desiratum. See, for example, the 1972 patent to Brunner, 3,667,971, wherein flat, rectangular pieces of dough are loaded on an endless conveyor belt which then passes through rollers which raise both sides of the belt and thus give the piece of dough a U-shape, after which the meat filler is dropped into the bottom of the U-trough, and this is followed by steps which further manipulate the dough into a round shape. Similar such structure is disclosed in other U.S. Pat. Nos., including Cooper, 3,782,272; Pomara, 3,757,676; Quintana, 4,084,493; and Anmahian, 4,393,758.

BRIEF SUMMARY OF THE INVENTION

One way of beginning to describe the hot tamale maker of the present invention is by describing the chambers, tubes and passageways through which the two discrete materials, meat core and masa case, travel from loading position to extrusion. Since for each material all of the volumes traversed are interconnected, it is appropriate to speak of a single masa passageway and a single meat passageway. Each passageway is L-shaped, with one leg disposed coaxially with the horizontal operating barrel of the device and the other leg extending traversely of the axis of rotation of the barrel, into a stub tube. With the left end of the barrel defined to be the exit end from which the hot tamales are extruded, the masa passageway has its horizontal leg extending rightwardly along the axis of the barrel, and may in fact be defined by the inner surface of the barrel wall at the exit end (although an inside sleeve may be added there, to reduce the thickness of the masa case), and terminates only a short distance to the right, where it joins its traverse leg or stub tube that extends radially from the barrel. This horizontal leg of the masa passageway is of larger cross section than the horizontal leg of the meat passageway, which is defined by a smaller diameter tube lying inside the masa passageway and also coaxial with the longitudinal axis of the barrel. This smaller but longer horizontal tube extends in closed fashion beyond the transverse leg of the masa passage, further to the right thereof, in order not to mix the two constituents. This horizontal leg of the meat tube then joins its tranverse leg or stub tube, the two stub tubes preferably being parallel for convenience in loading. Each of them is extended to more than a mere opening, so that a reasonable amount of the food ingredient can be loaded, by using a tube of appropriate length. Each L-shaped passageway is discrete and separate from the other.

Since neither of the L-shaped passageways extend to the right of the stub in which the meat filler is loaded, the right part of the barrel may be completely solid. At the right hand end, i.e., the end opposed to the discharge or extrusion end, the barrel is conveniently terminated with a short shaft extending through a vertical wall or block extending up from the base plate of the framework on which the cylindrical portion of the barrel rests. This short shaft extends slightly beyond its supporting block so that the projecting end may receive a lever for rotating the barrel between the loading position of the stub tubes, about midway between horizontal and vertical, and the power ram or extrusion position when the stub tubes are vertically aligned below a pair of sleeves fixed to the framework and receiving during their downstroke a pair of piston rams which pass through the sleeves and into the stub tubes, pushing the food components through their respective passageways and extruding them as hot tamales from the exit or orifice end of the barrel. The two passageways are dimensioned to obtain a predetermined meat-to-masa ratio, and the quantities loaded and pistons stroke are designed to extrude a hot tamale of a standard length, 4 inches as an example.

When a hot tamale has been fully extruded and the rams are to be raised in a recovery or retraction stroke, each passageway is partially filled with its particular food component, meat or masa. As the face of the ram starts to pull away from this soft material, in the absence of one feature of the invention a vacuum would be formed and the food component would tend to back up in its passageway and stay in contact with the ram face. To avoid this the present inventor had provided a sort of flapper valve mechanism on the end or face of the ram, part of which is making the ram in the form of a hollow cylinder with an open remote (upper) end and a cap extending across the near end, that which pushes on the food component. A number of openings are made through this cap to connect the interior of the hollow ram with the space underlying it, and a disc made of flexible material such as Neoprene is mounted with a single connecting screw which centers it on the cap. This flexible disc or stopper extends over the full cross section of the cap (or at least far enough across to overlie the openings through the cap), so that when the ram is pushing down against a load the disc is flattened and effectively stops the openings. On the up or retraction stroke, on the other hand, the disc hangs free and does not prevent air from rushing from the inside of the ram down through the openings in the cap, avoiding vacuum formation and preventing the food component from moving backwardly with the ram.

Another subsidiary feature of the invention is the linkage between the hand crank and the pair of rams used in the two strokes of the rams. This linkage makes use of a fixed bracket projecting rearwardly from the vertical wall of the framework, between the pair of vertically mounted piston rams, and receiving in a transverse opening toward its rearward end a pivot pin which connects it to a short link bar. The other end of the link bar has a second transverse opening through which a second pivot pin connects it to the distal end of an elongated crank in the general form of a metal tube. Close to its midlength the crank receives a long connecting pin which projects in both directions therefrom and transversely through both of the ram pistons, effectively linking the pair of pistons together for common movement as the user manipulates the hand crank. As will be more clearly evident in the detailed description below, the linkage components are sized and dimensioned so that there is a stable equilibrium position of the entire assembly when the piston rams are fully retracted, i.e., raised to the topmost part of the stroke. Such equilibrium is important to the user because it is at this point in the cycle that he temporarily leaves the rams and turns his attention to loading the food components in the stub loading tubes. While he is doing this, he needs to be assured that the rams will not glide downward under gravitational influence to interfere with his loading operation, and the linkage described gives him this assurance, more or less locking the piston rams at the top of their stroke until the user again manipulates his hand crank.

BRIEF DESCRIPTION OF THE DRAWING

The present invention will probably be more completely understood by referring to the drawing forming a part of the present document, and considering the same in conjunction with the detailed description which follows. In the drawing

DETAILED DESCRIPTION OF ONE PREFERRED EMBODIMENT, AS ILLUSTRATED

Figure 1:
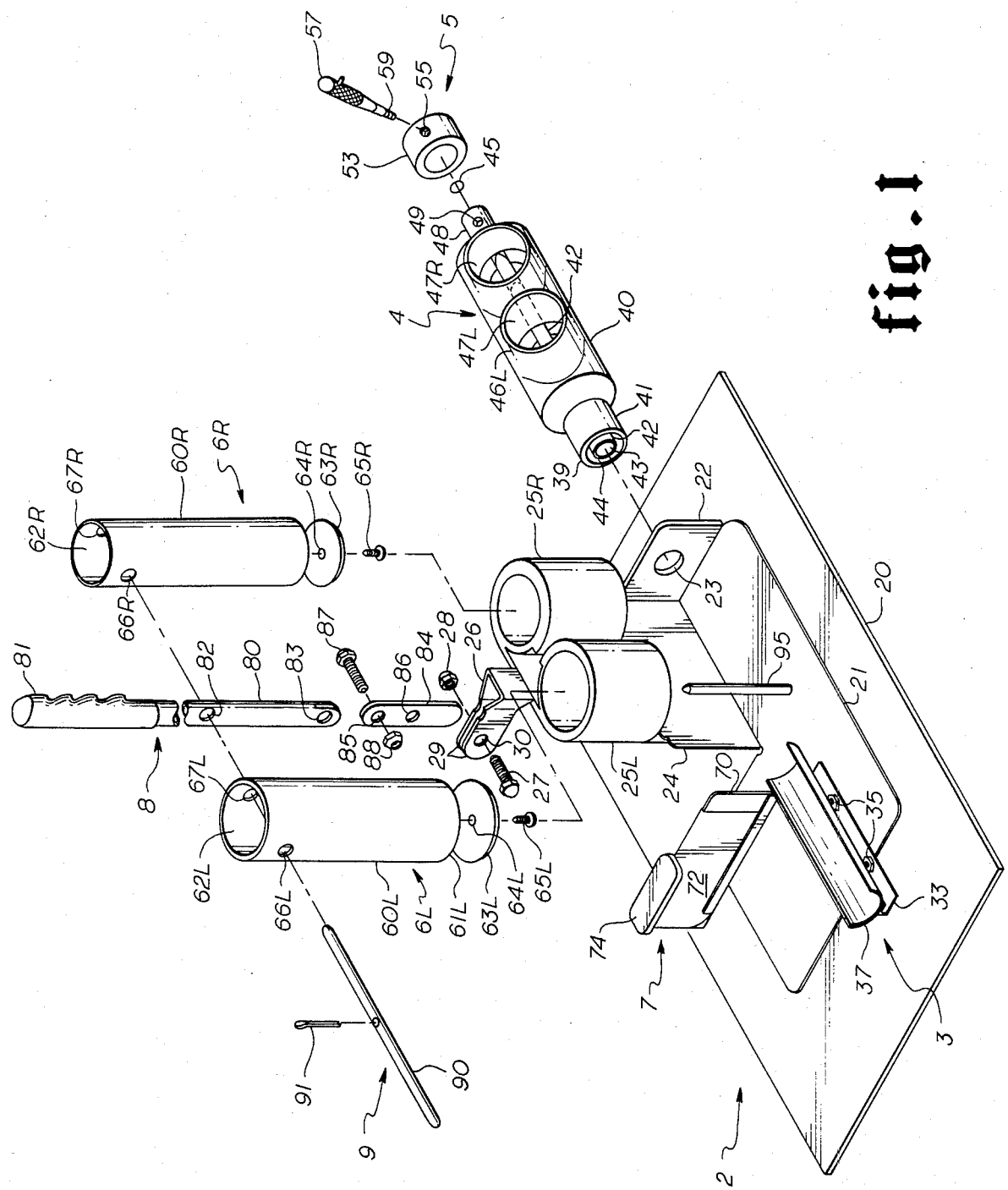
FIG. 1 is an exploded perspective view of a preferred embodiment of the invention.

As shown in the drawing, the main components of the hot tamale machine as conceived by the present inventor are the framework 2, barrel 4, the pair of piston assemblies 6L and 6R, and the crank assembly 8; subsidiary and less important subassemblies are the receiver of the finished tamales 3, the hand lever 5, the cutter 7, and the connector or pivot pin 9 which links the operating crank 8 to the pair of pistons or plungers or rams 6L and 6R. Framework 2 embraces all of the fixed parts of the machine, including the two flat and horizontal base members 20 and 21, which are integrally secured together and could be made as a single flat base, and the following upstanding members: the end wall 22 with opening 23 to support solid end 48 of barrel 40, and rear wall 24 which serves as a support for both the pair of parallel sleeves 25L and 25R and bracket 26. The pair of sleeves 25L and 25R and the bracket 26 are also considered to be parts of framework 2, and as a matter of fact these members plus base 21 and the walls 22 and 24 may be fabricated from a single flat sheet.

The gist of the invention is structurally realized in the barrel assembly 4, which is basically a right cylinder 40 which is hollowed out adjacent at least one end, its discharge end 39, which may be appropriately necked down as illustrated, and is elongated in the direction of its longitudinal axis 45. At such end 39 the cylinder or barrel 40 has an outer wall 41 defining a large passageway extending into the barrel to the first lateral or transverse passage indicated at 47L, the bore of stub tube 46L, but the large passage is broken into parts by a horizontal tube 42 mounted therewithin on the axis 45 of the barrel and extending into the tube to the second lateral passage indicated at 47R. Tube 42 is smaller in cross-section than the original passageway defined by wall 41, and breaks it up into the two passageways 43 and 44, passage 43 being the bore of tube 42 while 44 is an annulus lying between the outer surface of tube 42 and the inner surface of wall 41. This annulus 44 meets and joins the bore 47L of stub tube 46L in such manner that the two passages (44 and 47L) form a single L-shaped passageway which provides for fluid flow of semi-solid materials from one end to the other and is isolated from all other passageways in the barrel. The stub tube passageway 47L is formed by creating an appropriate opening through the wall of barrel 40 and welding or brazing thereto a short length of tubing 46L which extends beyond the outer surface of the barrel a short distance. A second stub tube 46R is similarly formed to become another part of the barrel assembly, somewhat more distant than stub tube 46L from exit orifice 39. As shown in the drawing, the smaller horizontal tube 42 extends from the discharge end 39 completely through the junction of the annular passageway 44 and the first or left hand bore 47L and on to intersect the right hand bore 47R at the intersection 51. As in the other case, these two passages are caused to join each other to form a single L-shaped passageway through which semi-liquid materials may be caused to flow without leakage, and this second L-shaped passageway is also isolated from all other passageways in the barrel, so that material loaded into one stub tube can not leak into the other, nor into the wrong L-shaped tube. The two stub tubes are preferably disposed to lie on parallel cross-section, and are carefully sized so that the desired ratio of core to crust is obtained in the finished tamale. In the drawing the arrangement is for the left hand stub tube to connect to the annular horizontal passageway, but there is no reason why this can not be reversed.

Figure 2:
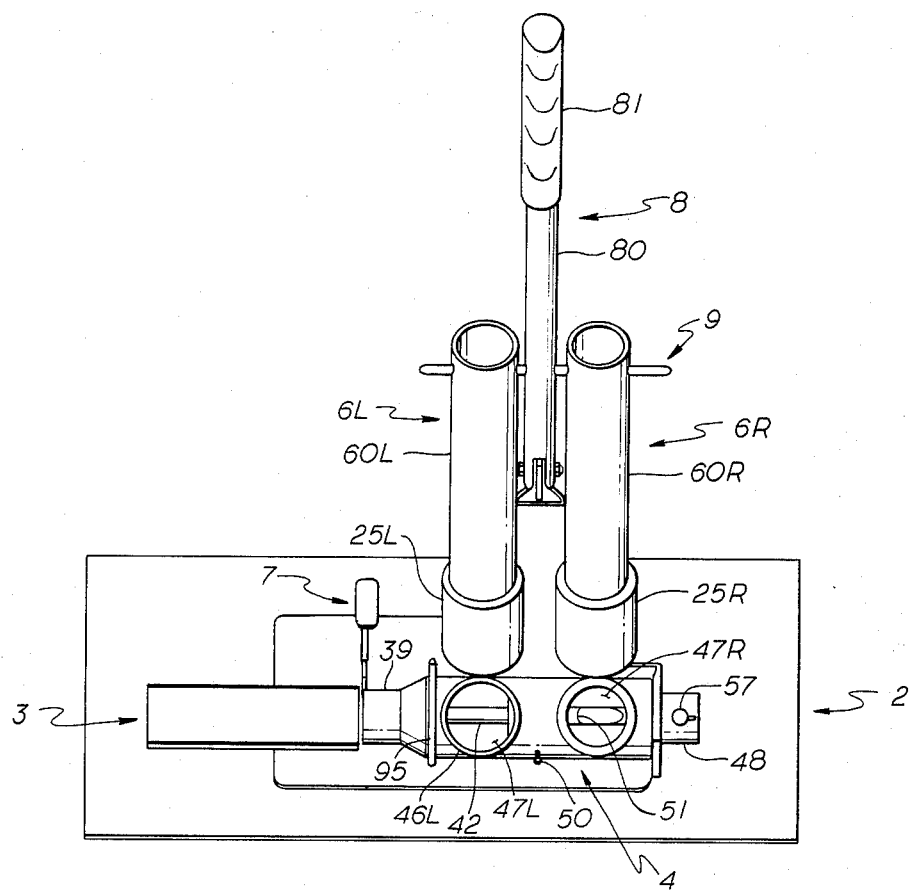
FIG. 2 is a forwardly tilted front view of the same embodiment in assembled condition, this view showing the barrel and stub loading tubes in their loading orientation, and with the piston rams fully retracted (fully raised).

As to the other components of the barrel assembly, to the right (in the drawing) of stub tube 46R barrel 40 may be appropriately necked down as shown and terminate in a solid shaft 48 which extends through and beyond opening 23 in end wall 22 of the framework, wall 22 thus serving as a sort of journal bearing or trunion block. The protruding portion of the shaft section 48 is provided with a drilled and tapped radial opening 49 to receive the threaded end 59 of the hand lever 57. This lever 57 also extends through a sleeve or collar loosely mounted on the stub shaft 48 to restrain the barrel 40 against axial movement, and is used to rotate barrel between the food-loading position of FIG. 2 and the extrusion position of FIG. 3. The pin 95 secured to and extending upwardly from base member 21 prevents horizontal movement of barrel 40 to the left and outwardly from back wall 24, which is contacted by the barrel in assembled position. By making the pair of stub tubes 46L and 46R of the same outside diameter as barrel 40, back wall 24 also serves as a stop for barrel rotation to the extrusion position, which is vertical as illustrated. To stop rotation in the other direction, i.e., into the food-loading position, a small set screw 50 is secured to and extends outwardly from barrel 40, as shown in FIG. 2. In the position there shown, the head of screw 50 is contacting base member 21 to hold the barrel 40 so that the stub tubes 46L and 46R are inclined at a convenient angle to the horizontal base, about at a 45 degree angle as shown.

As previously indicated, the pair of sleeves 25L and 25R are part of the framework and are disposed above base 21 with their axes vertical (although there is nothing critical about verticality; they need only extend upwardly and away from the base plate). The sleeves serve as guide members for the pair of pistons or rams 60L and 60R which are respectively the principal components of ram assemblies 6L and 6R. Each ram 60 slides loosely within a sleeve 25 between two extreme positions, the raised or retracted position shown in FIG. 2, in which it is clear of the stub tube 46, and the lower position shown in FIG. 3 in which it enters the bore 47 of the stub tube and pushes the food component loaded therein through its L-passageway to extrude it through the orifice end 39 of the barrel and out the orifice, either through 43 or 44. Each ram 60 is a hollow cylindrical shell having an open upper end 62L or 62R but with a cap closing its lower end (not shown) having vents therethrough so that the hollow interior of the ram or plunger 60L or 60R is in air communication with the air space immediately outside and below ram 60. Mounted on this cap extending completely across the lower end of ram 60 is a disc 63L or 63R of flexible material, e.g., Neoprene, such disc being secured at its center to the closure cap by a screw 65L or 65R passing through opening 64L or 64R and into a threaded opening not shown extending upwardly from the bottom of the cap. The assembly and configuration are such that during a power or downward stroke of the rams the discs 63 contact the food components and push them through their L-passageways without permiting any to enter the rams, i.e., the discs block all of the openings in the closure caps on the bottoms of the rams. On the upward or retraction stroke, however, discs 63 pull away from such caps except at the screws 65, uncovering the openings in the caps and permiting air flow from within the rams to the space underlying them. Ths flapper valve arrangement keeps the air pressure below the rams equal to that within them, avoiding any suction which could pull part of the ingredients up into the sleeves 25.

Motion is imparted to the pair of plunger or ram assemblies by hand manipulation of the crank assembly 8 as linked to the rams by connector assembly 9. The latter assembly consists primarily of the elongated pin 90, which passes through registering openings 66L and 67L in the ram 60L, 82 in the main lever 80 of the crank assembly, and the pair 66R and 67R in the ram 60R. (Cotter pin 91 passes through a pair of openings not shown through main lever 80 and the indicated central opening in pin 90 to prevent the assembly from coming apart by a horizontal sliding of pin 90.)

Figure 4:
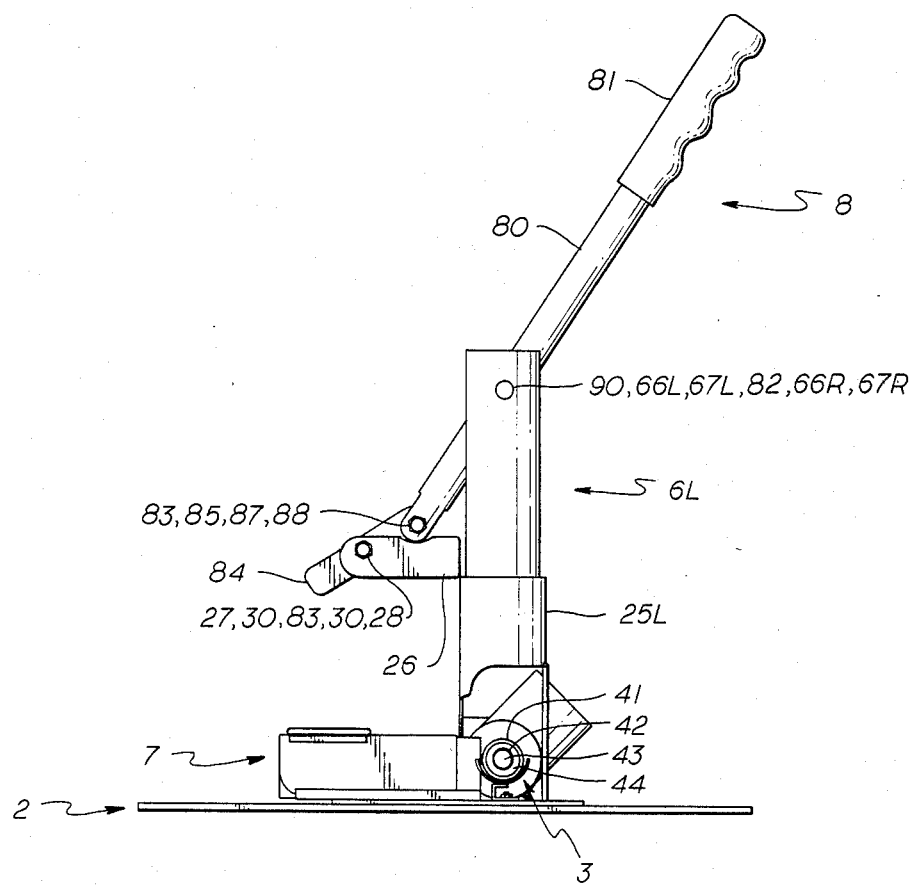
FIG. 4 is a left hand end elevation of the same embodiment, showing in particular the linkage assembly joining the hand crank with the pair of piston rams at the moment when the rams are at the top of their retraction stroke and waiting the attention of the user to start the next power stroke.

The complete crank assembly 8, as particularly illustrated in FIGS. 1 and 4, includes the link member 84 and the bracket 26 of the fixed framework 2. The link member 84 is connected to main lever 80 by connecting screw 87 and nut 88, the screw passing through the indicated pair of registering openings in the ends of the two members, 85 in the link member and 83 in the distal end of main lever 80 (distal as contrasted with the proximal or handgrip end 81 and the near-median opening 82). Link 84 is also connected to the fixed bracket 26 by connecting screw 27 and nut 28 passing through the holes 30 in the tines of the bracket and the opening 86 in link 84. In either case the nut is simply a cap nut to prevent inadvertent disassembly, the connection being such that there is no restriction on ready pivoting at the connection points. As is evident from FIG. 4, in operation the one fixed point of this arrangement is at the bracket 26, the center line of the screw or pivot pin 27 representing the fulcrum or axis of rotation of the link 84. The point represented by screw or pivot pin 87, carrying with it the distal end of main lever 80, will rotate about axis 27 at a radius equal to the distance between the two holes 85 and 86 in the link 84; by proper dimensioning this permits the point represented by the axis of pin 90 to define a straight line path, vertical or up and down in the figure. The arrangement also provides a temporary lock in the position shown in FIG. 4, wherein the pivot pin 87 lies within the angle defined by the intersection of the vertical line of motion of pivot pin (and rams 6) and the line connecting the two pivot pins 90 and 27, rather than outside the angle formed by these two lines. In such position no amount of downward force applied directly to rams 60 will so move them.

Figure 3:
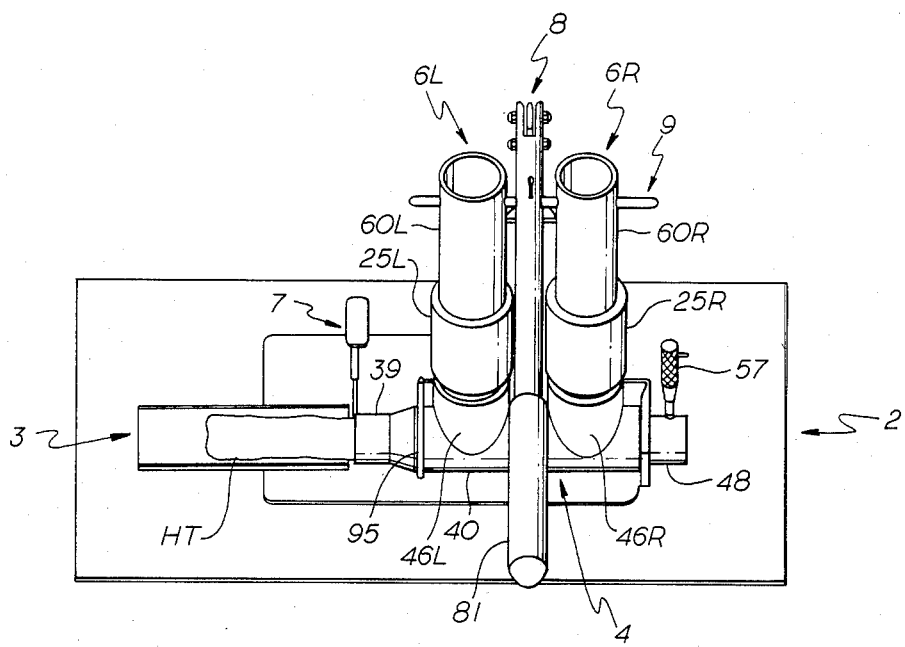
FIG. 3 is like FIG. 2 but shows the parts in their extrusion attitude, the stub loading tubes being vertically aligned below the piston rams. The rams are shown at the bottom of their power stroke, having just extruded a hot tamale from the output orifice of the barrel.

Receiver assembly 3 is something of an optional assembly, including a fixed 33 substructure secured to the base 21 by connectors 35 and a semi-circular trough 37 disposed in line with the orifice end of barrel 40 to receive the extruded hot tamale HT, as indicated in FIG. 3. The trough 37 may either be hinged to its base 33 so that rotation dumps the tamale on a corn shuck laid on the surface of the base, or it may be removably secured to the base by vertical pins in such manner that trough 37 may be raised and temporarily removed to carry the finished product to another location.

Cutter assembly 7 is another optional embellishment, consisting primarily of a knife member 72 with a handle 74 thereon, the knife being slidable on the fixed vertical guide 70 secured to and extending upwardly from the frame base 21. Such a sliding motion toward the observer in FIG. 3 will cleanly cut through the food HT being extruded from barrel 40, leaving a square end to the material remaining in the barrel.

The reader may desire to make some hot tamales with the machine as described, and the inventor therefore includes the following recommended recipes:

Masa

Quantities will make 83 tamales of 4-inch length.

Mix the following in a mixing bowl with dry, clean hands:

48 oz. (6, 8-oz. cans) of ready mix masa, La Predilecto brand
3 teaspoons of salt
1 teaspoon of sugar
Add 16 oz. warmed lard, knead in well by hand.
Place in refrigerator to cool and set lard, and it's ready.

Meat Filler

Preparation will fill about 67 tamale shells of 4-inch length.

Place in a suitable cooking vessel 10 pounds of boiled beef and 3 pounds of boiled chicken.

Cover the meat with a mixture consisting of the following dissolved in a pint of water: 16 oz. gelatin (4 packs), 8 oz. of tomato sauce, 2 tablespoons of salt, 1 tablespoon of cumin, 1 tablespoon of oregano, 2 tablespoons of sugar, 4 tablespoons of masa, and 1 tablespoon of red pepper.

Cook the meat as thus covered until the meat can be readily separasted from the bones.

Strain off the broth. Separate the meat, and discard the bones.

Chop finely 5 bell peppers, 12 onions, 14 garlic cloves, and 3 jalapeno peppers, and add all these to 32 oz. whole tomatoes which have been drained of all juice (2, 16-oz. cans). Add these vegetables to the strained broth.

Add 8 oz. (2 sticks) of oleo and 6 L tablespoons of lard.

Cook this mix of broth, vegetables and shortening until the vegetables are done.

Chop the meat, remove all bone and gristle, and add it to the cooked mixture.

Simmer for 30 minutes. Refrigerate. The final mixture should have a consistency about like that of potted meat.

In the above the present inventor has illustrated and described a hot tamale machine as one preferred embodiment, but it is to be understood that the designer of average skill has been presented with a disclosure capable of many variations which will now be apparent to him. Such variations are within the spirit of the present invention, which should not be considered as limited except as set forth in the appended claims, which are to be construed as embracing all substantially equivalent means for accomplishing the same ends in substantially the same manner. One variation already mentioned lies in disposing the smaller diameter L-tube closer to the extrusion end of the barrel, which can be done by necking down the inner portion of its stub tube to join smoothly to the smaller longitudinal tube, and extending the larger longitudinal passageway further to the right in the figure. The stub tubes need not be parallel to one another, this being largely a matter of convenience, and likewise it is convenient to make the guide sleeves for the operating rams with a vertical orientation, rather than at some acute angle to the horizontal base plate, etc. And it will also be apparent that the machine described can be utilized for other types of food products, including confectionary types of foodstuffs, in general any food in which a first material is to have a core surrounded by a shell or case of a second type of material.

What is claimed is:

1. A barrel member of a hot tamale machine comprising a main element in the general form of a right cylinder elongated along its longitudinal axis and having openings at one end defining a discharge orifice, and also comprising a pair of side-by-side stub tubes secured to and extending from the cylinder outwardly from its longitudinal axis, each of such stub tubes defining a generally cylindrical passageway open at its outer end, said cylinder being hollow over a portion contiguous with its discharge end to define an outer wall and having a cylindrical passageway coaxial with the longitudinal axis of the cylinder and extending from the discharge orifice to one of the stub tubes where it intersects and joins with the passageway of such stub tube so that the two form a single (first) L-shaped passageway which is isolated from all other passageways, said barrel also comprising a generally cylindrical small tube disposed within the passageway of the main cylinder and also coaxial with the longitudinal axis thereof, such small tube being of smaller cross-section than its accommodating passageway and defining therein an annulus lying between the outer surface of the small tube and the wall of such passageway, such small tube extending longitudinally from the discharge orifice to the other of the stub tubes and joined thereto so that its hollow interior joins the passageway of the stub tube so that the two passages form a single (second) L-shaped pasageway which is isolated from all other passageways, each of thé two L-shaped passageways providing a continuous flow path for semi-liquid materials from the outer end of the stub tube to the discharge orifice of the barrel.

2. The barrel member of claim 1 in which the axes of the two stub tubes extend parallel to one another in a common radial direction relative to the longitudinal axis of the main cylinder.

3. The barrel member of claim 1 in which the end of the member opposite the orifice end is solid and has a journal surface adapted for support in a cylindrical friction bearing.

4. The barrel member of claim 3 in which the solid end of the barrel is provided with a radially extending hand lever.

5. A hot tamale machine comprising the barrel member of claim 1 together with a framework with a flat, table-top base, a pair of rams disposed above the barrel and such base, and crank means pivotally connected to the framework and pair of rams, the stub tubes of the barrel being parallel and normal to the barrel's longitudinal axis, the barrel being mounted generally horizontally in the framework for rotation about its own longitudinal axis between an upper or extrusion position of the stub tubes in which they lie below and in coaxial alignment with said pair of rams, and a lower position in which said stub tubes are free of said rams and tilted away therefrom so that their open ends are available for loading, said pair of rams being parallel to one another and mounted in the framework for sliding motion between an upper position in which they are disengaged from said stub tubes of the barrel and a lower position in which they lie partially within said stub tubes, there being a multiplicity of intermediate positions wherein said rams enter and successively push on any food components loaded into the stub tubes and push the same through the L-passageways and out the discharge orifice of the barrel.

6. The hot tamale machine of claim 5 in which said crank means comprises a main lever, a link in the form of a short lever, and a bracket secured to the framework, together with a pivot pin linking the main lever to the pair of rams at points adjacent the top ends of the rams and near to the midpoint of the main lever, one end of the main lever serving as the operating handle while the distal end is connected by a (second) pivot pin to one end of the link, said link being connected to the bracket by a (third) pivot pin passing through openings in the two members, these three pivot pins and the openings therefor being disposed so that operation of the crank permits straight line motion of the pair of rams.

7. The hot tamale machine of claim 6 in which, when the pair of rams are raised to their extreme raised position, the pivot pin connecting the distal end of the main lever to the link member lies within an angle formed by the line of action of the rams and a line connecting the other two pivot points.

8. A machine for making hot tamales of the type comprising an elongated core of meat or sweetmeat surrounded by a similarly elongated case of dough, said machine comprising:
 a. a barrel having a bore therethrough open at one end denominated the exit orifice,
 b. a meat tube supported concentrically within said bore and defining therewith an annulus for the dough portion of the hot tamales, said meat tube also being open at one end and thereat being approximately coterminous with the open end of the bore,
 c. a dough-loading stub tube secured to and extending laterally from the barrel, such stub tube at one end having its hollow interior in communication with said annulus for the passage of dough while its opposed end is open for loading,
 d. a meat-loading stub tube likewise secured to and extending laterally from the barrel, such tube having its hollow interior in communication with the bore of the meat tube while its opposed end is open for loading, and
 e. a pair of crank-operated pistons disposed to operate through a linear stroke having one extreme position in which the pistons are adjacent but withdrawn from the pair of stub tubes and another extreme position at which the pistons have entered the stub tubes and forced some of the dough and meat out of the stub tubes and into the meat tube and dough annulus, and thereafter out of the exit orifice.

9. The hot tamale machine of claim 8 which includes flapper valve means to prevent backward movement of the meat and dough with the pistons during the retraction or raising of the pistons, such means comprising making the pistons hollow with open upper ends and closed but perforated lower ends, each flapper valve comprising a flexible disc center mounted on one of the closed lower ends of the pistons to block and flow through the perforations during the downstroke of the pistons but permit free air flow therethrough during the upstroke.

* * * * *